United States Patent
Semba et al.

(10) Patent No.: US 7,035,034 B2
(45) Date of Patent: Apr. 25, 2006

(54) DATA STORAGE DEVICE, CONTROL DEVICE, OFF-TRACK CONTROL METHOD, AND CONTROL METHOD

(75) Inventors: Tetsuo Semba, Zama (JP); Naoyuki Kagami, Fujisawa (JP); Akira Tokizono, Fujisawa (JP); Gaku Ikedo, Chigasaki (JP)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 10/442,803

(22) Filed: May 21, 2003

(65) Prior Publication Data

US 2003/0231423 A1     Dec. 18, 2003

(30) Foreign Application Priority Data

May 29, 2002   (JP)   ............................. 2002-156406

(51) Int. Cl.
*G11B 5/596*   (2006.01)
(52) U.S. Cl. ...................... 360/75; 360/77.03
(58) Field of Classification Search ................. 360/75, 360/60
See application file for complete search history.

(56) References Cited

U.S. PATENT DOCUMENTS

| | | | | |
|---|---|---|---|---|
| 4,297,734 A | * | 10/1981 | Laishley et al. | 360/78.09 |
| 5,426,545 A | * | 6/1995 | Sidman et al. | 360/78.09 |
| 6,115,200 A | * | 9/2000 | Allen et al. | 360/60 |
| 6,212,026 B1 | * | 4/2001 | Ohmi et al. | 360/60 |
| 6,496,320 B1 | * | 12/2002 | Liu | 360/75 |
| 6,674,600 B1 | * | 1/2004 | Codilian et al. | 360/75 |

* cited by examiner

*Primary Examiner*—K. Wong
(74) *Attorney, Agent, or Firm*—Timothy N. Ellis

(57) ABSTRACT

A hard disk device includes a servo control unit that constitutes a servo loop for a head seek for performing read/write of data from/to a recording medium, a correction signal generation unit for generating a correction signal for correcting a control by the servo control unit based on an output of a predetermined sensor, and a correction signal control unit for estimating an effect of supplying the correction signal to the servo loop and for controlling whether or not the correction signal is to be supplied to the servo loop in response to a result of the estimation. Moreover, the gain of the sensor is dynamically controlled in response to the above estimation result.

30 Claims, 10 Drawing Sheets

DATA STORAGE DEVICE, CONTROL DEVICE, OFF-TRACK CONTROL METHOD, AND CONTROL METHOD

BACKGROUND OF THE INVENTION

The present invention relates to a method for controlling a controlled system based on an output signal of a sensor, and more particularly, to a control method based on output signals of a plurality of sensors.

In a data storage device (hereinafter, referred to as a "disk drive") for recording data in a rotational recording medium such as a hard disk device, means for coping with off-track generated by vibrations is essential. For example, off-track becomes a problem when data recorded on a data-track other than a target data track is overwritten during data write. Therefore, a method exists, in which a sensor for vibration shocks is provided beforehand in the disk drive, and a control for interrupting to write data is performed in the case of detecting vibrations. Moreover, there is a method for controlling a head so as to follow the center of a track by adding a correction signal proportional to a vibration to a servo loop for an actuator of a disk drive in the case where the sensor detects the vibration.

Recent years, a track density has been increased more with an increase in capacity of a recording medium. Thus, the off-track has been apt to occur even by a vibration generated by which the disk drive itself seeks the head or by a vibration generated by a disk drive adjacent to the concerned disk drive in a system such as a disk array. Accordingly, in the above-described control method in which the data write is interrupted at the time of vibration generation, the lowering in performance of the disk drive must be brought about.

Here, as means for coping with the off-track in the hard disk device, a control method will be considered in which a correction signal is added to a servo loop. In the hard disk device, an arm that indicates a head rotates around a rotation shaft by a voice coil motor (VCM), and thus the head seeks for a desired track of the recording medium. Therefore, a vibration for allowing the disk drive to rotate parallel to the surface along which the arm rotates (hereinafter, referred to as a "vibration in the rotational direction") changes a relative position between the VCM and the recording medium, thus generating the off-track. Accordingly, a sensor for detecting the vibration in the rotational direction is provided in the disk drive. As such a sensor for detecting the vibration in the rotational direction, a rotational acceleration sensor for directly sensing a rotational acceleration or a sensor composed by combining two sensors that are linear acceleration sensors for sensing accelerations in the linear direction is usually used. From a viewpoint of cost, the sensor configured by combining the two linear acceleration sensors is used more often.

FIGS. 10(A) and 10(B) are schematic views showing sensors for detecting these vibrations in the rotational direction: FIG. 10(A) shows the configuration obtained by combining two linear acceleration sensors; and FIG. 10(B) shows the rotational acceleration sensor.

In FIG. 10(A), when the disk drive 1010 vibrates in the linear direction (Lv in the drawing), the sensors 1011 and 1012 sense the same accelerations individually, and therefore, a difference therebetween becomes 0. Meanwhile, when the disk drive 1010 vibrates in the rotational direction (Rv in the drawing), a difference occurs between the accelerations sensed by the sensors 1011 and 1012, and therefore, it is detected that a vibration in the rotational direction is given to the disk drive 1010.

In FIG. 10(B), when the disk drive 1020 vibrates in the rotational direction, a rotational electrode in the sensor 1021 rotates, and thus, an electrostatic capacitance between a fixed electrode and the rotational electrode is changed. Therefore, it is detected that a vibration in the rotational direction is given to the disk drive 1020.

When the vibration in the rotational direction is detected by combining the linear acceleration sensors in such a manner as described above, theoretically, the vibration in the rotational direction is detected accurately as described above. However, actually, owing to variations in gain of the linear acceleration sensors the vibration in the linear direction may sometimes be detected as the vibration in the rotational direction. In other words, when gains of two linear acceleration sensors are not equal to each other, even if a vibration in the linear direction is the same, the accelerations sensed by the two linear acceleration sensors will differ from each other, and a difference therebetween is mistakenly detected as a vibration in the rotational direction. Such variations in gain of the linear acceleration sensors occur in the manufacturing process of the linear acceleration sensors, and it is difficult to remove the variations completely.

Moreover, due to a characteristic vibration based on a flexure of a disk drive's substrate onto which the two linear acceleration sensors are attached or the like, it can occur that a vibration in the linear direction is converted into a vibration in the rotational direction, and that a vibration is not transmitted to the two linear acceleration sensors while keeping a correct level. Also in such cases, a vibration component in the linear direction will be undesirably included in the vibration detected by the sensors.

Furthermore, even if the vibration in the rotational direction of the disk drive is detected by use of the rotational acceleration sensor, the rotational acceleration sensor undesirably will have some sensitivity for the vibration in the linear direction when the center of gravity of the rotational electrode and the center of rotation thereof do not coincide with each other accurately due to an error in the manufacturing process of the rotational acceleration sensor or the like.

When the vibration component in the linear direction is included in the vibration detected by the sensor as described above, a correction based on the vibration in the linear direction, which does not actually affect the off-track, will be undesirably made if a correction signal based on the above vibration detection is added to the servo loop for the actuator of the disk drive. Therefore, such a correction will rather cause the off-track.

Note that the above description has been made by exemplifying the case where the disk drive is a hard disk device and the vibration in the rotational direction is required to be detected. However, it may sometimes be required to detect a signal in a direction other than the rotational direction depending on the type of the disk drive, and it may sometimes be required to detect various vibrations in objects other than the disk drive.

SUMMARY OF THE INVENTION

In this connection, it is an object of the present invention to effectively prevent an occurrence of an operational error in a correction operation based on an output from the sensor by dynamically controlling the gain of the sensor.

In order to achieve the foregoing object, the present invention is realized as a data storage device configured as follows. Specifically, this data storage device comprises: an actuator for supporting and moving a head for performing read/write of data from/to a recording medium; a servo control unit for feedbacking a position error signal which is obtained by scanning the recording medium with the head, to the actuator, thereby controlling an operation of the actuator; a correction signal generation unit for generating a correction signal for correcting a control by the servo control unit; and a correction signal control unit for estimating an effect of supplying the correction signal generated in the correction signal generation unit into a servo loop formed of the actuator and the servo control unit and for controlling as to whether or not the correction signal is to be supplied to the servo loop in response to a result of the estimation.

Here, preferably, the correction signal generation unit generates the correction signal based on output signals obtained by sensing a vibration of the data storage device by a plurality of sensors. Then, the correction signal control unit estimates an effect of supplying the correction signal to the servo loop by use of the output signals of the plurality of sensors.

More specifically, the correction signal generation unit calculates appropriate gains in the individual sensors based on the output signals of the plurality of sensors and estimates the effect of supplying the correction signal to the servo loop based on the obtained appropriate gains of the respective sensors.

Moreover, another data storage device of the present invention comprises: an actuator for supporting a head; a servo control unit for feedbacking a position error signal which is obtained by scanning the recording medium with the head, to the actuator, thereby controlling an operation of the actuator; and a sensor for sensing a vibration of the data storage device and correcting a control performed by the servo control unit. Then, the data storage device is characterized in that an appropriate gain of the sensor is calculated based on an output signal of the sensor and the position error signal, and the gain of the sensor is dynamically controlled based on a result of the calculation.

Herein, it is possible to compose the sensor, by a plurality of linear acceleration sensors provided for detecting a rotational vibration of the data storage device. Then, appropriate gains of the individual linear acceleration sensors are calculated based on output signals of the plurality of linear acceleration sensors and the position error signal.

Moreover, a control device of the present invention, which achieves the foregoing object, comprises: control signal generating means for generating a control signal for controlling, by use of output signals of a plurality of sensors, a predetermined system to be controlled; and control signal supply controlling means for evaluating an effect of supplying the control signal to the system to be controlled based on the output signals of the plurality of sensors and for controlling as to whether the control signal is to be supplied thereto based on the evaluation.

Here, more preferably, the control signal supply controlling means evaluates the effect of supplying the control signal to the system to be controlled based on predetermined gains in the individual sensors, the gains being calculated based on the output signals of the plurality of sensors.

Furthermore, another control device of the present invention comprises: control signal generating means for generating a control signal for controlling, by use of an output signal of a sensor, a predetermined system to be controlled; and sensor controlling means for dynamically controlling a gain of the sensor based on a calculated value of the gain in the sensor, the calculated value being calculated based on the output signal of the sensor.

Here, the control signal generating means generates the control signal based on output signals of a plurality of the sensors, and the sensor controlling means calculates gains in the individual sensors based on the output signals of the plurality of sensors and dynamically controls the gains of the individual sensors based on a result of the calculation.

Furthermore, the present invention is realized as an off-track control method as will be described below, in which a head performs read/write of data by scanning a data track of a recording medium. This off-track control method comprises the steps of: generating a correction signal for correcting a drive control for an actuator supporting the head based on an output signal of a sensor detecting a vibration of a data storage device; estimating an effect of supplying the correction signal into a servo loop of the actuator; and controlling as to whether or not the correction signal is to be supplied to the servo loop in response to a result of the estimation.

Here, more specifically, the step of generating a correction signal is performed in such a manner that the correction signal for a rotational vibration is generated based on output signals of a plurality of linear acceleration sensors. Then, the step of estimating an effect of supplying the correction signal includes the steps of: calculating appropriate gains in the individual linear acceleration sensors based on the output signals of the plurality of linear acceleration sensors; and estimating the effect of supplying the correction signal to the servo loop based on the obtained appropriate gains of the linear acceleration sensors.

Moreover, another off-track control method of the present invention comprises the steps of: calculating an appropriate gain of a sensor detecting a vibration of the data storage device based on an output signal of the sensor and a position error signal obtained by scanning a recording medium by a head; dynamically controlling the gain of the sensor based on a result of the calculation; and correcting a drive control for an actuator supporting the head based on the output signal of the sensor of which gain is controlled.

More preferably, the step of calculating an appropriate gain of a sensor calculates appropriate gains of a plurality of linear acceleration sensors provided for detecting a rotational vibration of the data storage device individually.

Furthermore, the present invention is also realized as a control method as will be described below, which uses a sensor. Specifically, this control method comprises the steps of: generating a control signal for controlling, by use of output signals of a plurality of sensors, a predetermined system to be controlled; calculating appropriate gains in the individual sensors based on the output signals of the plurality of sensors; and evaluating an effect of supplying based on the obtained appropriate gains of the respective sensors the control signal to the system to be controlled; and controlling based on the evaluation as to whether or not the control signal is to be supplied.

This control method can further comprise the step of dynamically controlling the gains of the individual sensors based on the appropriate gains of the respective sensors, the gains being obtained by the calculation.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

The embodiment of the present invention will be described below in detail by exemplifying a hard disk device.

This embodiment monitors a signal of a sensor for detecting a vibration and a position signal of a head, and generates a correction signal that is a control signal for controlling an actuator so as to prevent the off-track of the head. Then, an effect obtained when this correction signal is added to a servo loop is estimated and evaluated, and a determination is dynamically performed based on the above estimation result as to whether or not the gain of the sensor should be changed or as to whether or not the correction signal should be added to the servo loop.

First, a hardware configuration of a general hard disk device will be described.

Figure 9:
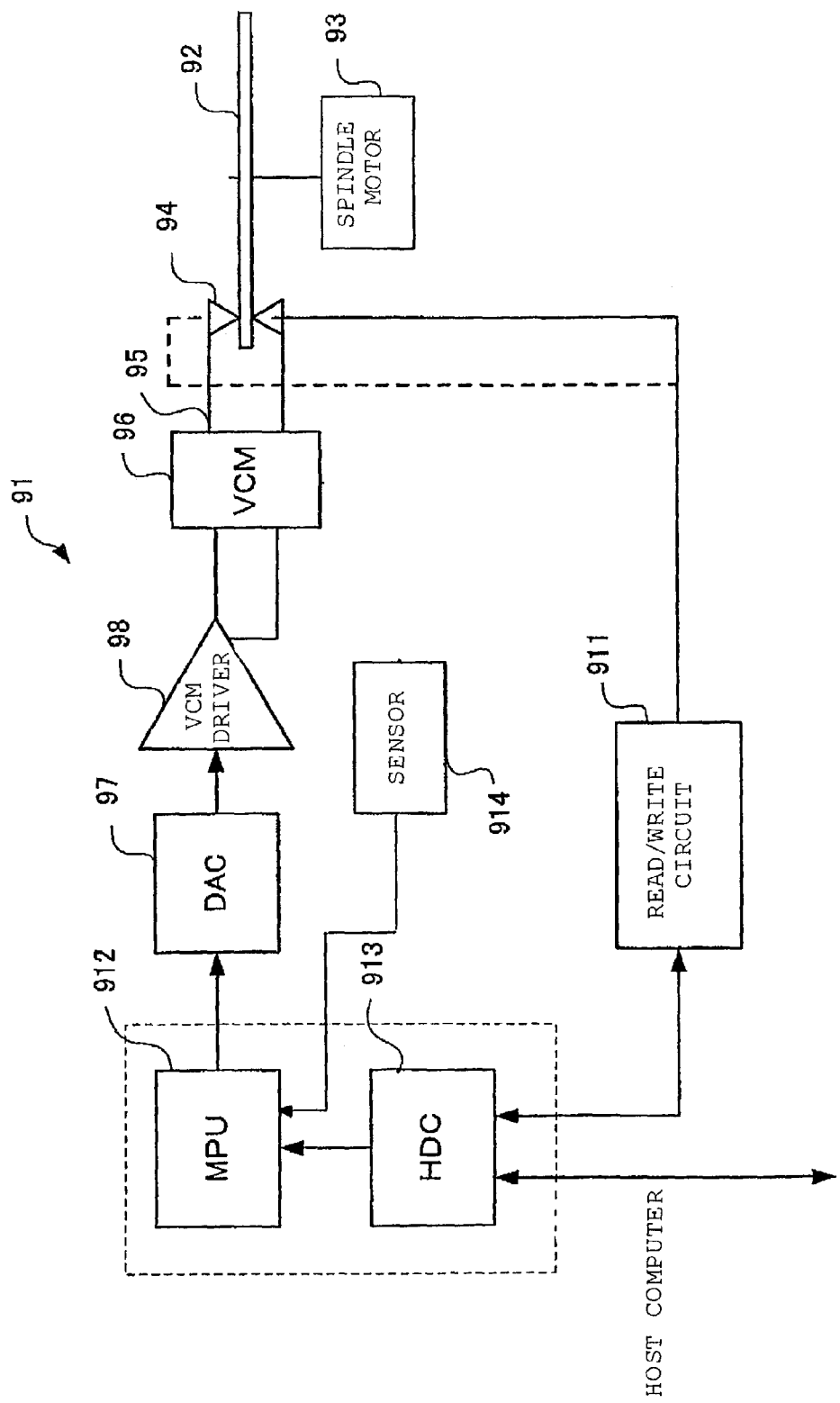
FIG. 9 is a block diagram showing principal portions of the hard disk device.
Figure 10:
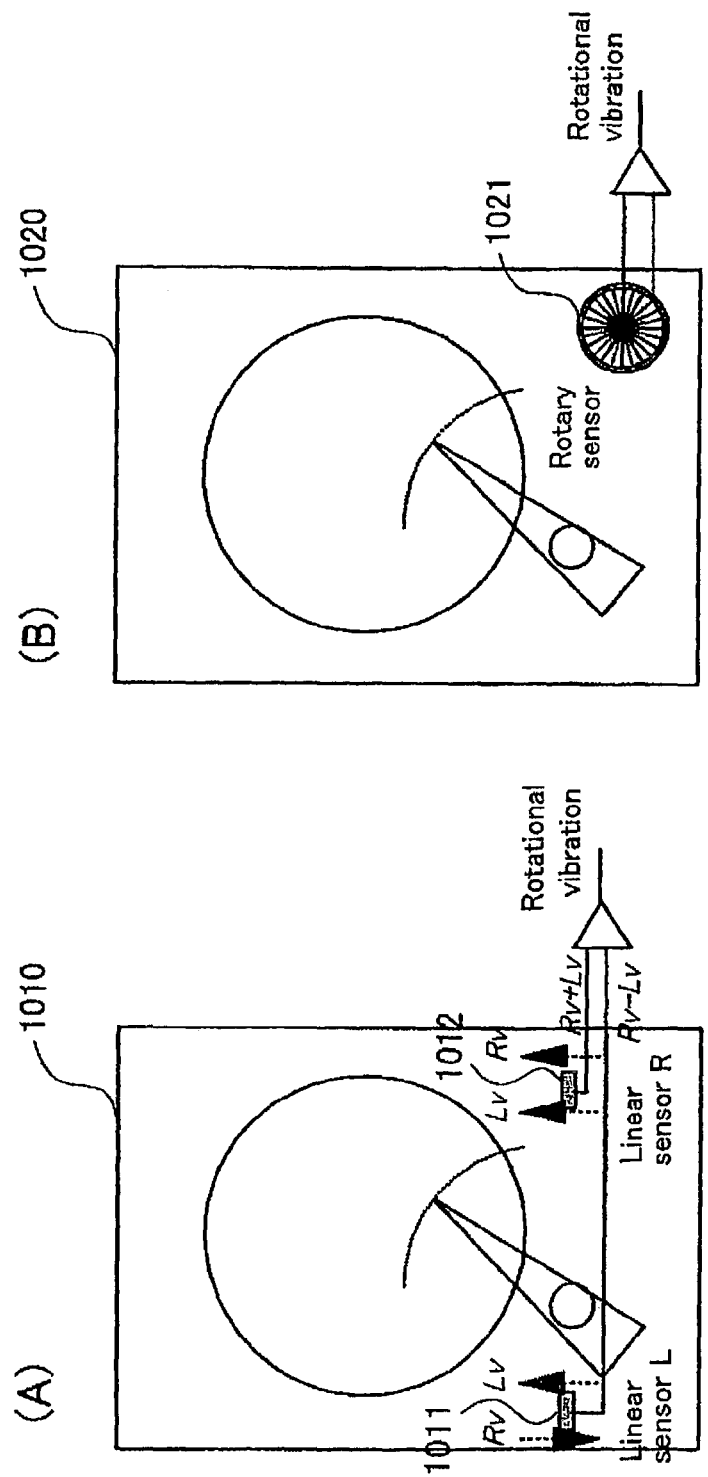
FIGS. 10(A) and 10(B) are schematic views showing sensors for detecting vibrations in a rotational direction.

FIG. 9 is a block diagram showing principal portions of the hard disk device 91. The hard disk device 91 is a data storage/reproduction device, in which the magnetic heads 94 seek on the magnetic disk 92 rotationally driven by the spindle motor 93 and stops at a predetermined track (position) to write data to the magnetic disk 92 or reads data written to the magnetic disk 92. Either a single or plural number of magnetic disk 92 is mounted according to requirements, although, FIG. 9 illustrates an example of a single magnetic disk.

When the hard disk device 91 is under operation, the magnetic disk 92 is rotationally driven around the spindle shaft of the spindle motor 93. When the hard disk device 91 is not under operation, the magnetic disk 92 stops its rotation (stays still). Two magnetic heads 94 are held by tip portions of the actuator 95 so as to correspond to the front and back surfaces of the magnetic disk 92 and execute write and read of data to/from the magnetic disk 92. The actuator 95 is driven by the voice coil motor (VCM) 96 controlled by the MPU (micro processing unit) 912 through the digital/analog converter (DAC) 97 and the voice coil motor (VCM) driver 98. Specifically, the VCM 96 is driving means for the actuator 95.

The read/write circuit 911 executes read/write processing for data. Specifically, the read/write circuit 911 converts write data transferred from a host computer through the HDC (hard disk controller) 913 into a write signal (current) and supplies the write current to the magnetic heads 94. The magnetic heads 94 execute write of the data to the magnetic disk 92 based on this write current. Meanwhile, the magnetic heads 94 convert a read signal (current) read out from the magnetic disk 92 into digital data and output the digital data to the host computer.

The HDC 913 has functions as an interface of the hard disk device 91. As one of the functions, the HDC 913 receives the write data transferred from the host computer and transfers the received data to the read/write circuit 911. Moreover, the HDC 913 transfers the read data transferred from the read/write circuit 911 to the host computer. Furthermore, the HDC 913 transfers the read data to the MPU 912 upon receipt of an instruction command from the host computer.

The MPU 912 is in charge of controlling the hard disk device 91. As a function thereof, the MPU 912 controls the spindle motor 93 to perform a highly precise rotation control for the magnetic disk 92 in this embodiment.

The sensor 914 is a vibration sensor for detecting vibrations generated in the hard disk device 91. In this embodiment, the sensor 914 is comprised of two linear acceleration sensors and detects the vibrations in the rotational direction in the hard disk device 91. The output of the sensor 914 is converted into a correction signal for correcting the operation of the actuator to control the head to follow the center of the track, and then the correction signal is supplied to the VCM 96.

Figure 1:
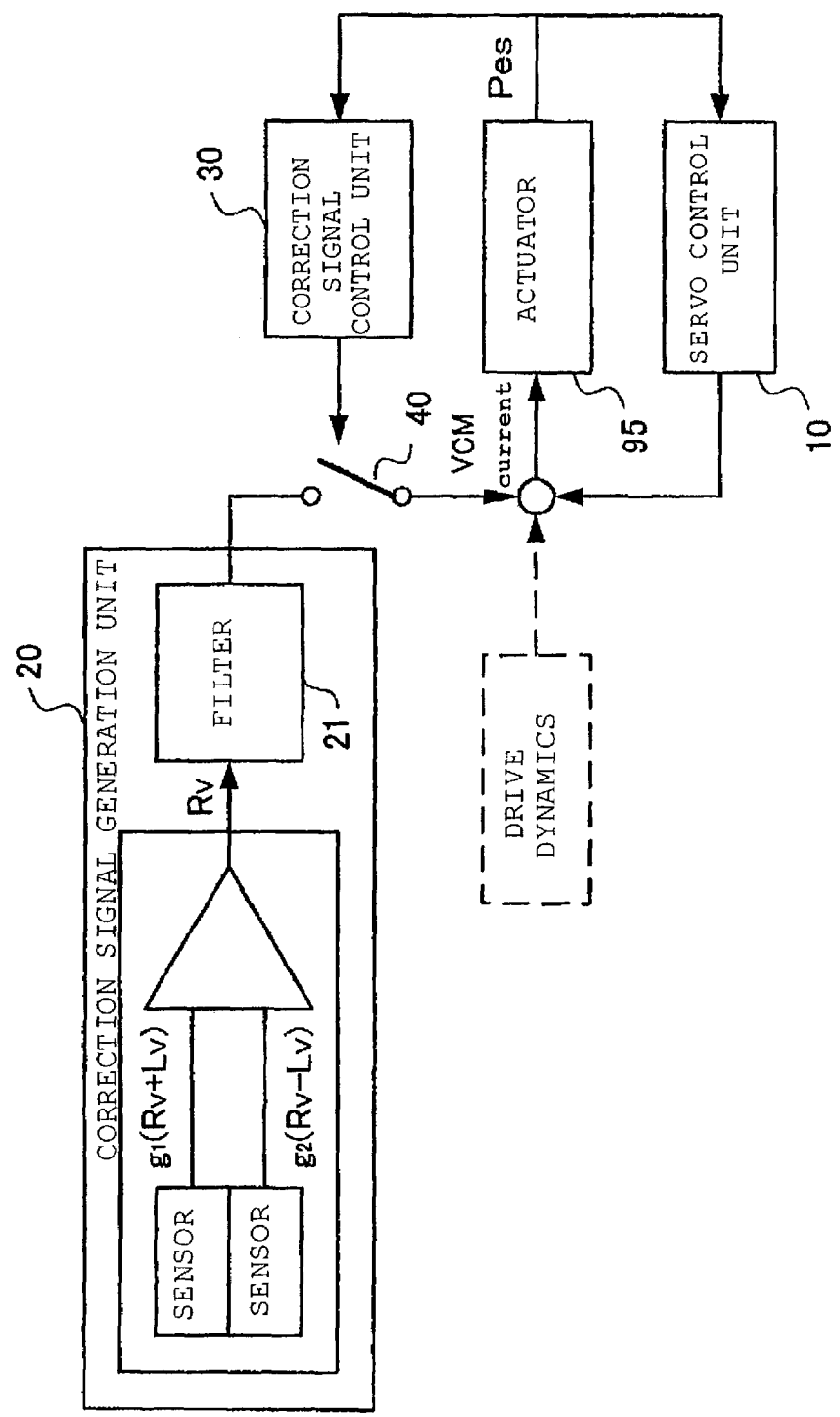
FIG. 1 is a block diagram showing a configuration with regard to a control mechanism for an actuator in a hard disk device according to this embodiment.

FIG. 1 is a block diagram showing a configuration with regard to a control mechanism for the actuator in the hard disk device 91 according to this embodiment.

When referring to FIG. 1, the hard disk device 91 of this embodiment includes the servo control unit 10 that constitutes a servo loop for the actuator 95, the correction signal generation unit 20 as correcting means for the servo loop which generates a correction signal, for correcting the operation of the actuator 95 so as to prevent off-track caused by the vibrations of the hard disk device 91, the correction signal control unit 30 for controlling as to whether or not the correction signal generated in the correction signal generation unit 20 is to be supplied to the actuator 95, and the switch 40.

In FIG. 1, the servo control unit 10 receives a signal (Pes) indicating an error of a head position, which is obtained by reading position information recorded in the magnetic disk 92 by the magnetic head 94, and controls the actuator 95 to correct the head position appropriately based on Pes.

The correction signal generation unit 20 passes the output of the sensor 914, that is, a difference between the outputs of the two linear acceleration sensors through the filer (digital filter) 21 for noise removal. Then, the correction signal generation unit 20 supplies the output as a correction signal to the VCM 96.

The correction signal control unit 30 receives the output of the two linear acceleration sensors that constitutes the sensor 914 and Pes obtained in the magnetic head 94 and calculates a suitable gain for the sensor 914 (hereinafter, referred to as the "optimum gain"). Then, based on the calculation result, the correction signal control unit 30 controls the supply of the correction signal generated in the correction signal generation unit 20 to the VCM 96.

Figure 2:
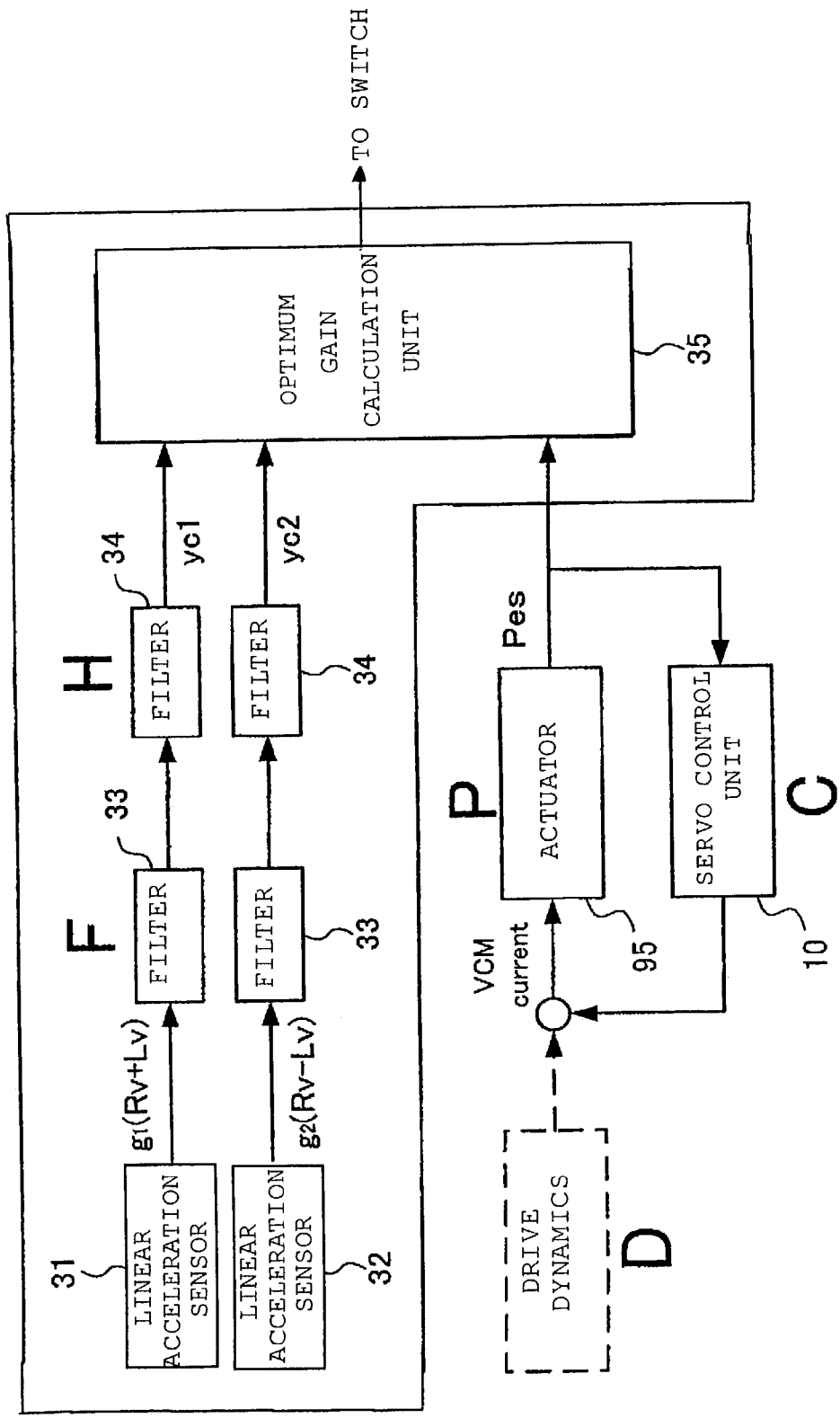
FIG. 2 is a block diagram showing a configuration of a correction signal control unit in this embodiment.

FIG. 2 is a block diagram, showing the configuration of the correction signal control unit 30.

When referring to FIG. 2, the correction signal control unit 30 includes the two linear acceleration sensors 31 and 32 that constitute the sensor 914, the filters (digital filters) 33 with the same property as that of the filter 21 in the correction signal generation unit 20, the filters (digital filters) 34 having a transfer function equivalent to a transfer function owned by the mechanical characteristics of the hard disk device 91 itself, and the optimum gain calculation unit 35 for receiving the outputs of the filters 34 and the Pes to calculate the optimum gain for the sensor 914. The outputs of the linear acceleration sensors 31 and 32 pass through the filters 33 and 34 independently of each other and are outputted to the optimum gain calculation unit 35.

The correction signal control unit 30 in this embodiment functions as sensor controlling means for dynamically setting the gains of the linear accelerations sensors 31 and 32 based on the optimum gains of the linear acceleration sensors 31 and 32, which have been calculated in the optimum gain calculation unit 35. Moreover, the correction signal control unit 30 evaluates an effect of supplying the correction signal to the servo loop based on the calculated optimum gains of the linear acceleration sensors 31 and 32, and controls the switch 40, and thus functions as supply controlling means for the correction signal.

Here, the case is conceived, where the correction of the operation control for the actuator is performed without providing the correction signal control unit 30 but only by the supply of the correction signal generated in the correction signal generation unit 20. Note that, in the description below, the reference symbol D indicates drive dynamics (transfer function) meaning a mechanical feature brought to a relative position relationship between the magnetic head 92 and the magnetic disk 94 by vibrations from the outside. Moreover, the reference symbol P indicates the transfer function of the actuator 95; the reference symbol C indicates the transfer function of the servo control unit 10; and the reference symbol F indicates the transfer function of the filter 21 constituting the correction signal generation unit 20.

A component appearing in the position error signal (Pes) of the hard disk when the rotational vibration Rv and the linear vibration Lv are generated is affected only by the rotational vibration Rv and represented by the following Equation 1 using the transfer functions D, P and C.

$$Pes = \frac{D \cdot P}{1 - P \cdot C} Rv \quad \text{Equation 1}$$

Furthermore, in the case of correcting the off-track by use of the sensor 914, the signals from the sensor 914 (on the assumption that the gains of the sensors are $g_1$ and $g_2$, respectively) are added to the VCM current (output current of the VCM 96). The transfer function from the vibration to Pes, which is obtained in this case, is represented by Equation 2.

$$Pes = \frac{D \cdot P}{1 - P \cdot C} Rv - \frac{F \cdot P}{1 - P \cdot C} \{g_1(Lv + Rv) - g_2(Lv - Rv)\} \quad \text{Equation 2}$$

Here, the term Lv of the linear vibration will be canceled out when $g_1 = g_2$, and Equation 2 will be represented as in Equation 3.

$$Pes = \left\{ \frac{D \cdot P}{1 - P \cdot C} - \frac{2g_1 \cdot F \cdot P}{1 - P \cdot C} \right\} Rv \quad \text{Equation 3}$$

Here, the right side will be zero when $D = 2g_1 \cdot F$, and therefore, influence of the rotational vibration does not bring about any position error. However, when the gains $g_1$ and $g_2$ of the sensors 914 do not coincide with each other, the linear vibration component Lv is detected. Therefore, the signal proportional to the Lv in Equation 2 appears in Pes, which will rather cause the off-track. When $D = 2g_1 \cdot F$ is not established, the influence of the rotational vibration will not be removed completely, and therefore, a degree of improvement for the control of the actuator is low.

Figure 3:
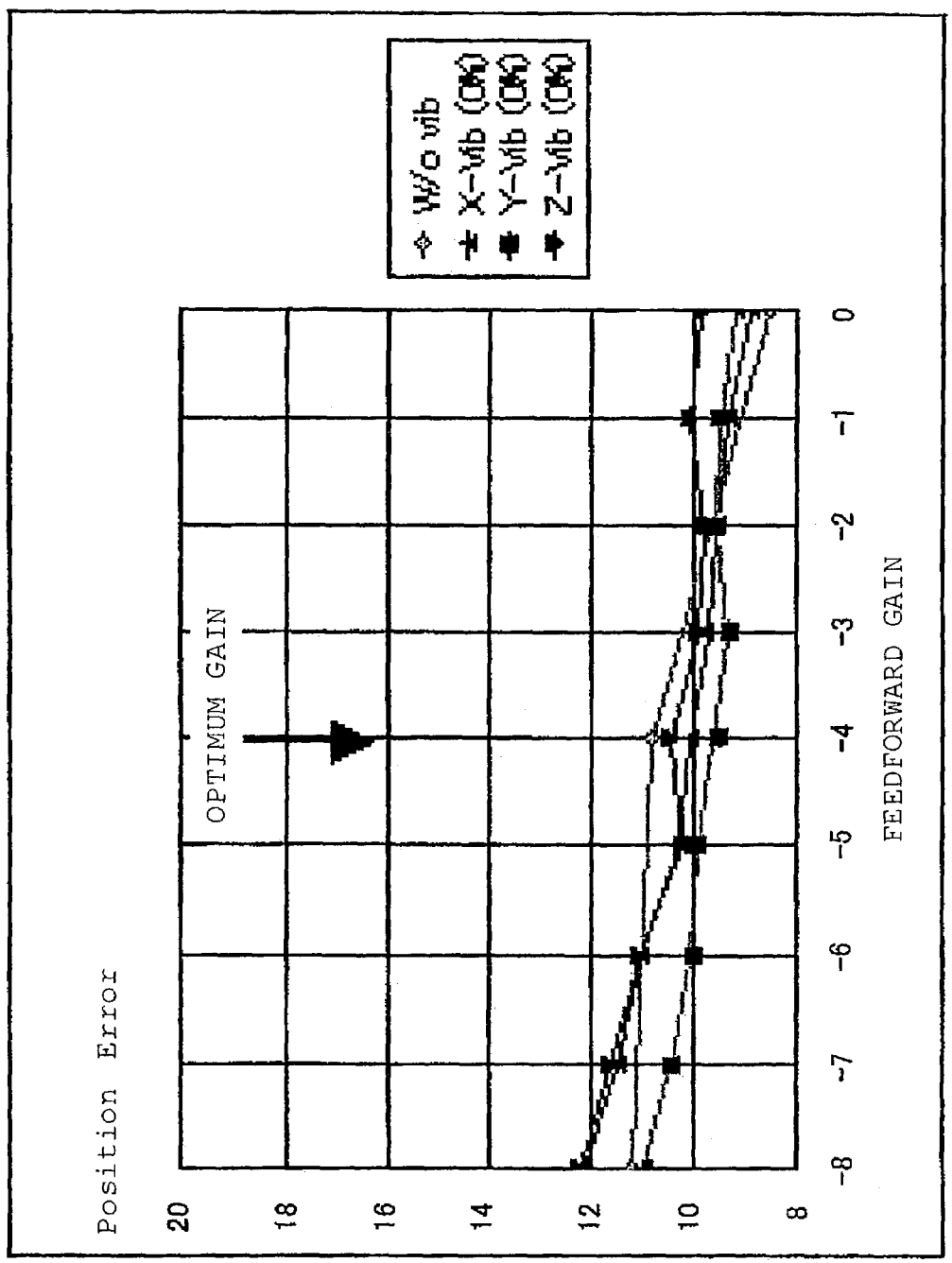
FIG. 3 is a graph showing the amplitude change of Pes with the change in the level of a correction signal supplied into a servo loop when no variations exist in gains of two linear acceleration sensors in the hard disk device of FIG. 1.

FIG. 3 is a graph showing the amplitude change of Pes by changing the level of the correction signal supplied to the servo loop when no variations exist in the gains of the two linear acceleration sensors in the sensor 914. In FIG. 3, the line W/o vib indicates the value of Pes in a state without vibrations, and the lines X-Vib, Y-Vib and Z-Vib indicate values of Pes for vibrations in three directions orthogonal to one another (X, Y and Z directions).

When referring to FIG. 3, it is understood that the larger the gain of the linear acceleration sensors are Pes is more apt to be affected by the linear vibration. In other words, under the condition where the linear vibration exists, the setting of the gain for minimizing the amplitude of Pes will not always be the same as that in the case where the linear vibration does not exist. Under such a condition, it is desirable to set a gain slightly smaller. Moreover, because the sensor 914 always generates noise when outputing the difference, the amplitude of Pes will be deteriorated when the correction signal generated based on the noise is supplied to the servo loop.

Furthermore, the vibration generated in the hard disk device 91 differs between the time of manufacture thereof and the time of use thereof. Therefore, a mechanism capable of adjusting the signal level of the correction signal not only at the time of manufacture but also at the time of operation (use) thereof is necessary. As means for adjusting the correction signal for the above purpose, a method is conceived, in which the correction signal is tried to be actually supplied to the servo loop to retrieve the optimum gain and confirm the effect. However, this method is not desirable since the operation (read/write of data) of the hard disk device 91 will be interrupted.

Accordingly, in this embodiment, the correction signal generated in the correction signal generation unit 20 is not actually supplied to the servo loop, but instead the correction signal control unit 30 estimates and evaluates the effect that would be obtained by the supply. Then, the correction signal control 30 switches on and off the switch 40 in response to the above evaluation, and thus controls the gain of the sensor 914 keeping the gain in the optimum range.

While referring to the configuration of the correction signal control unit 30 shown in FIG. 2, a technique for controlling the gain of the sensor 914 will be described. Note that the reference symbols D, P and C indicate the above-described transfer functions, respectively, and the reference symbol H indicates the transfer functions of the filters 34.

A signal from the sensor 914 is not added to the servo loop for the actuator 95, but signals obtained by passing the output signals of the two linear acceleration sensors 31 and 32 through the filters 33 and 34 respectively are defined as $yc_1$ and $yc_2$. Then, the following expression is calculated by use of the coefficients $k_1$ and $k_2$ for comparing these signals $yc_1$ and $yc_2$ with Pes.

Pes−$k_1$·$yc_1$+$k_2$·$yc_2$

Note that H should be preset from the characteristics of the servo to satisfy the following equation.

$$H = \frac{P}{1 - P \cdot C} \qquad \text{Equation 4}$$

Then, the following Equation 5 is established.

$$Pes - k_1 \cdot yc_1 + k_2 \cdot yc_2 = \frac{D \cdot P}{1 - P \cdot C} Rv - H \cdot \qquad \text{Equation 5}$$
$$F\{k_1 \cdot g_1(Lv + Rv) - k_2 \cdot g_2(Lv - Rv)\}$$
$$= \frac{P}{1 - P \cdot C} \{D \cdot Rv - F \cdot k_1 \cdot g_1(Lv + Rv) +$$
$$F \cdot k_2 \cdot g_2(Lv - Rv)\}$$

Accordingly, the calculated value of this equation becomes 0 when $k_1 \cdot g_1 = k_2 \cdot g_2$ and $D = 2k_1 \cdot g_1 \cdot F$, and the calculated value of Equation 3 also becomes 0 simultaneously. Therefore, the operation control for the actuator 95 in the hard disk device 91, which is shown in FIG. 1, functions effectively.

Accordingly, in this embodiment, the evaluation function V is defined as a square of a standard deviation of:

Pes−$k_1$·$yc_1$+$k_2$·$yc_2$

Then, the coefficients $k_1$ and $k_2$ minimizing the value thereof are obtained by a specific algorithm. When the specific condition is met, the switch 40 is switched on and off to supply the correction signal outputted from the correction signal generation unit 20 to the VCM 96, thus performing the correction.

The specific condition is, for example, a case where the effect of supplying the correction signal from the calculation result in the algorithm is estimated to be large, when there is a period of time in which a command of a user was not inputted to the hard disk device 91 immediately after a power source thereof is turned on, or when an error in the read/write was detected.

Moreover, since the hard disk device 91 is constantly executing the read/write operation, the write operation is particularly apt to be affected by external vibrations. Accordingly, an error ratio due to the positional shift of the head to the off-track direction per write operation is constantly monitored by a control microprocessor. Thus, the switch 40 can be switched on and off in response to the occurrence frequency of the error, and the determination as to whether or not the correction signal is to be supplied by the foregoing algorithm and the optimization of the gain to be supplied can be performed.

Figure 4:
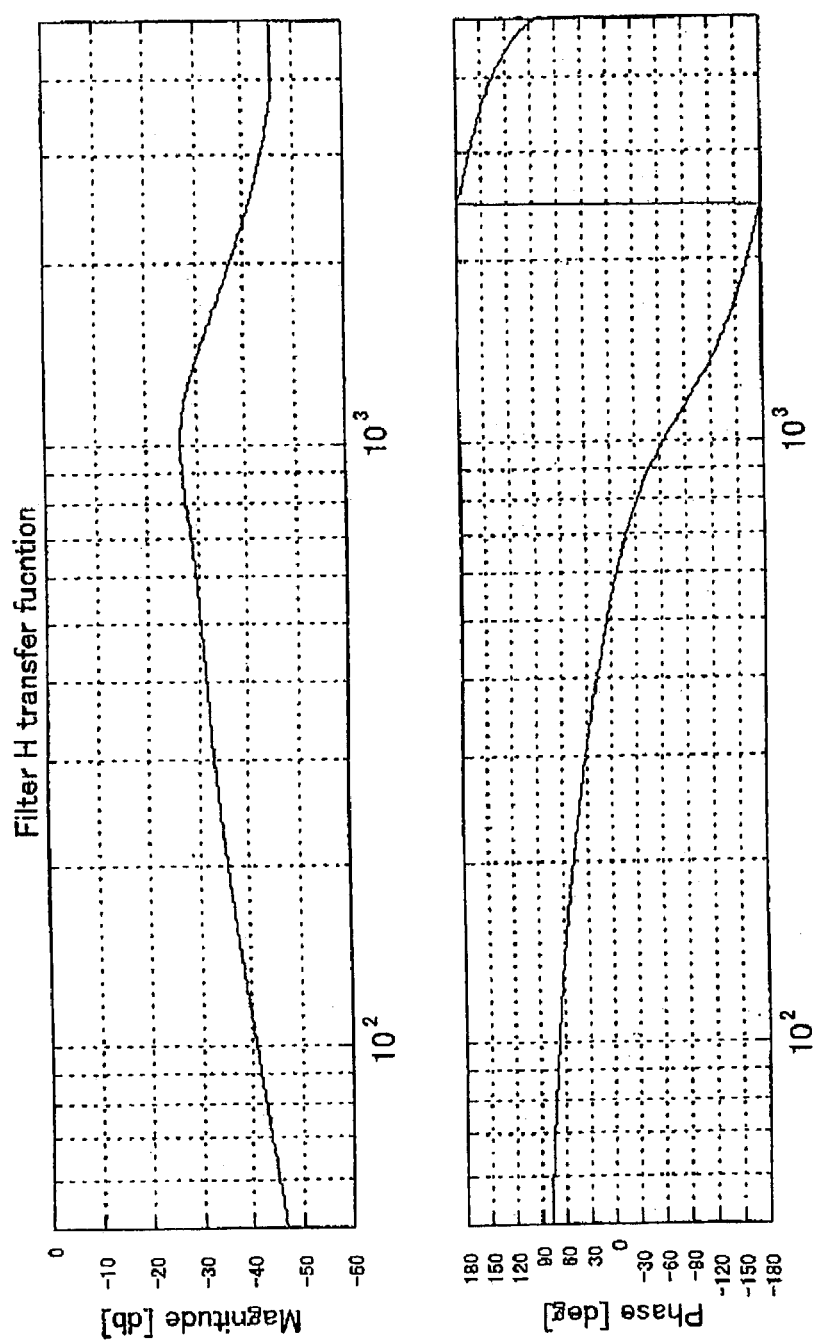
FIG. 4 is graphs showing a transfer function H of filters of FIG. 2.

FIG. 4 is graphs showing the transfer function H of the filters 34, which is obtained from Equation 4.

When the transfer function H shown in FIG. 4 is expressed by a calculation formula, for example, the transfer function H is established as in the following Equation 6.

$$H = \frac{-2.6 Z^4 + 5.3 Z^2 - 2.6}{Z^4 - 3.8 Z^3 + 5.5 Z^2 - 3.5 Z + 0.84} \qquad \text{Equation 6}$$

The filters 33 simulating the drive dynamics (transfer function) D of the hard disk device 91 itself equivalently have characteristics in which gains are substantially 1 in the band to be used. Therefore, the drive dynamics D may be conceived to be included in the characteristics of the transfer function H. Accordingly, the signals $yc_1$ and $yc_2$ are obtained by passing the output signals of the linear acceleration sensors 31 and 32 through the filters 34 of the transfer function H.

In order to estimate the optimum gain by varying the gains of the output signals of the linear acceleration sensors 31 and 32, the following Equation 7 may satisfactorily be calculated with regard to the evaluation function V to estimate in which a gain (coefficients $k_1$ and $k_2$) value is minimized.

$$V^2 = \sum_n \{Pes(n) - k_1 \cdot yc_1(n) + k_2 \cdot yc_2(n)\}^2 \qquad \text{Equation 7}$$

The solution for minimizing the evaluation function V in Equation 7, is able to be solved when, a value obtained by partially differentiating the evaluation function V with respect to the coefficients $k_1$ and $k_2$ becomes 0. Therefore, the solution can be obtained by the following equation.

Equation 8

$$\frac{\partial V^2}{\partial k_1} = \frac{\partial \left\{ \sum_n Pes(n)^2 - 2k_1 \sum_n Pes(n) \cdot yc_1(n) + 2k_2 \sum_n Pes(n) \cdot yc_2(n) - 2k_1 k_2 \sum_n yc_1(n) \cdot yc_2(n) + k_1^2 \sum_n yc_1(n)^2 \cdot k_2^2 \sum_n yc_2(n)^2 \right\}}{\partial k_1}$$

$$= -2 \sum_n Pes(n) \cdot yc_1(n) - 2k_2 \sum_n yc_1(n) \cdot yc_2(n) + 2k_1 \sum_n yc_1(n)^2$$

$$\frac{\partial V^2}{\partial k_1} = 2 \sum_n Pes(n) \cdot yc_2(n) - 2k_1 \sum_n yc_1(n) \cdot yc_2(n) + 2k_2 \sum_n yc_2(n)^2$$

When this Equation 8 is 0, the evaluation function V takes the extremum. Therefore, if the following Equation 9 is assigned to Equation 8, then the optimum gains of the linear acceleration sensors 31 and 32 will be as in the following Equation 10.

$$\frac{\partial V^2}{\partial k_1} = 0 \qquad \text{Equation 9}$$

$$\frac{\partial V^2}{\partial k_2} = 0$$

-continued $$k_{1\,opt} = \frac{\sum_n Pes(n) \cdot yc_1(n) \sum_n yc_2^2(n) - \sum_n Pes(n) \cdot yc_2(n) \sum_n yc_1(n) \cdot yc_2(n)}{\sum_n yc_1{}^2(n) \sum_n yc_2^2(n) - \{\sum_n yc_1(n) \cdot yc_2(n)\}^2}$$

$$k_{2\,opt} = \frac{-\sum_n Pes(n) \cdot yc_2(n) \sum_n yc_1^2(n) - \sum_n Pes(n) \cdot yc_1(n) \sum_n yc_1(n) \cdot yc_2(n)}{\sum_n yc_1{}^2(n) \sum_n yc_2^2(n) - \{\sum_n yc_1(n) \cdot yc_2(n)\}^2}$$

Equation 10

The standard deviation in this case is obtained by assigning Equation 10 to Equation 7.

$$V_{opt}^2 = \sum_n Pes(n)^2 +$$

$$\frac{-2\sum_n Pes(n) \cdot yc_1(n) \sum_n Pes(n) \cdot yc_2(n) \sum_n yc_1(n) \cdot yc_2(n) + \{\sum_n Pes(n) \cdot yc_2(n)\}^2 \sum_n yc_1(n)^2 + \{\sum_n Pes(n) \cdot yc_1(n)\}^2 \sum_n yc_2(n)^2}{\sum_n yc_1{}^2(n) \sum_n yc_2^2(n) - \{\sum_n yc_1(n) \cdot yc_2(n)\}^2}$$

Equation 11

The first term of Equation 11 corresponds to the magnitude of the position error signal (Pes) in the case where the correction signal is not added, and the second term thereof indicates the effect of the correction signal. Accordingly, if the value of the optimum gains are approximate the original value, and if the value of the second term of Equation 11 is large, then it can be determined that the correction effect when the correction signal is added to the servo loop is large.

Specifically, as an actual operation of the drive, Pes and the output signals of the linear acceleration sensors 31 and 32 are constantly monitored, the signals $yc_1$ and $yc_2$ are calculated through the filters 34 of the transfer function H represented in Equation 6. Moreover, six elements obtained in the following Equation 12 are calculated to be stored in a storage device such as a cache memory provided in the hard disk device 91.

$$m_0 = \sum_n Pes(n)^2$$

$$m_1 = \sum_n Pes(n) \cdot yc_1(n)$$

$$m_2 = \sum_n Pes(n) \cdot yc_2(n)$$

$$m_3 = \sum_n yc_1(n) \cdot yc_2(n)$$

Equation 12

$$m_4 = \sum_n yc_1^2(n)$$

$$m_5 = \sum_n yc_2^2(n)$$

Because these elements are the sums of detected values for certain periods of time, the up-to-data status of the hard disk device 91 should be constantly reflected thereon by taking the sums at appropriate time intervals and performing the switching control for the switch 40. The optimum gains and evaluation function of the linear acceleration sensors 31 and 32 can be obtained by the calculation of Equation 13 by assigning the stored Equation 12 to Equations 10 and 11.

$$k_{1\,opt} = \frac{m_1 \cdot m_5 - m_2 \cdot m_3}{m_4 \cdot m_5 - m_3^2}$$

$$k_{2\,opt} = \frac{m_1 \cdot m_3 - m_2 \cdot m_4}{m_4 \cdot m_5 - m_3^2}$$

$$V_{opt}^2 = m_0 + \frac{-2m_1 \cdot m_2 \cdot m_3 + m_2^2 \cdot m_4 + m_1^2 \cdot m_5}{m_3^2 - m_4 \cdot m_5}$$

Equation 13

Moreover, if the gains of the two linear acceleration sensors 31 and 32 are not shifted from each other to a great extent, then the components of the rotational vibrations and the linear vibrations can be obtained by the following Equations 14 and 15, respectively, which can then be used for a condition determination to be described later.

$$\sum_n \{yc_1(n) - yc_2(n)\}^2 = m_4 + m_5 - 2m_3$$

Equation 14

$$\sum_n \{yc_1(n) + yc_2(n)\}^2 = m_4 + m_5 + 2m_3$$

Equation 15

In the actual processing for the servo, the switching on/off of the switch 40 according to this embodiment is performed in a manner as will be described below.

When a condition composed of OR or AND of the following eight conditions is established, the optimum gains $k_{1\,opt}$ and $k_{2\,opt}$ are set as the gains $g_1$ and $g_2$ of the sensor 914 (linear acceleration sensors 31 and 32) in the correction signal generation unit 20, and the switch 40 is switched on by the control of the correction signal control unit 30, and thus the correction by the correction signal is made effective.

1) when the hard disk device 91 power is turned on;
2) when the hard disk device 91 is in some error state;
3) when the error occurrence frequency for either or both of the read/write commands inside the drive has statistically increased to exceed a set reference;
4) when the hard disk device 91 is unable to read or write target data;
5) when the optimum gain calculated from the values of the foregoing stored elements $m_1$ to $m_5$ are within a scheduled range that is when $$k_{1\,min} \leq k_{1\,opt} \leq k_{1\,max}, \quad k_{2\,min} \leq k_{2\,opt} \leq k_{2\,max}$$

(when the estimation for the gain is valid);

6) when the second term of Equation 11 is larger than the predetermined reference value $s_1$ represented as follows (when it is effective to supply the correction signal to the servo loop);

$$s_1 < \frac{-2m_1 \cdot m_2 \cdot m_3 + m_2^2 \cdot m_4 + m_1^2 \cdot m_5}{m_3^2 - m_4 \cdot m_5} \quad \text{Equation 16}$$

7) when the value of the foregoing stored element $m_0$ is larger than the reference value $m_{0\ max}$ (when the off-track occurs and some correction is necessary therefor); and
8) when the value of $m_4+m_5+2m_3$ based on the foregoing stored elements $m_3$ to $m_5$ is larger than the reference value $S_{3\ max}$ (when the component of the rotational vibration detected from the sensor 914 is large).

Figure 5:
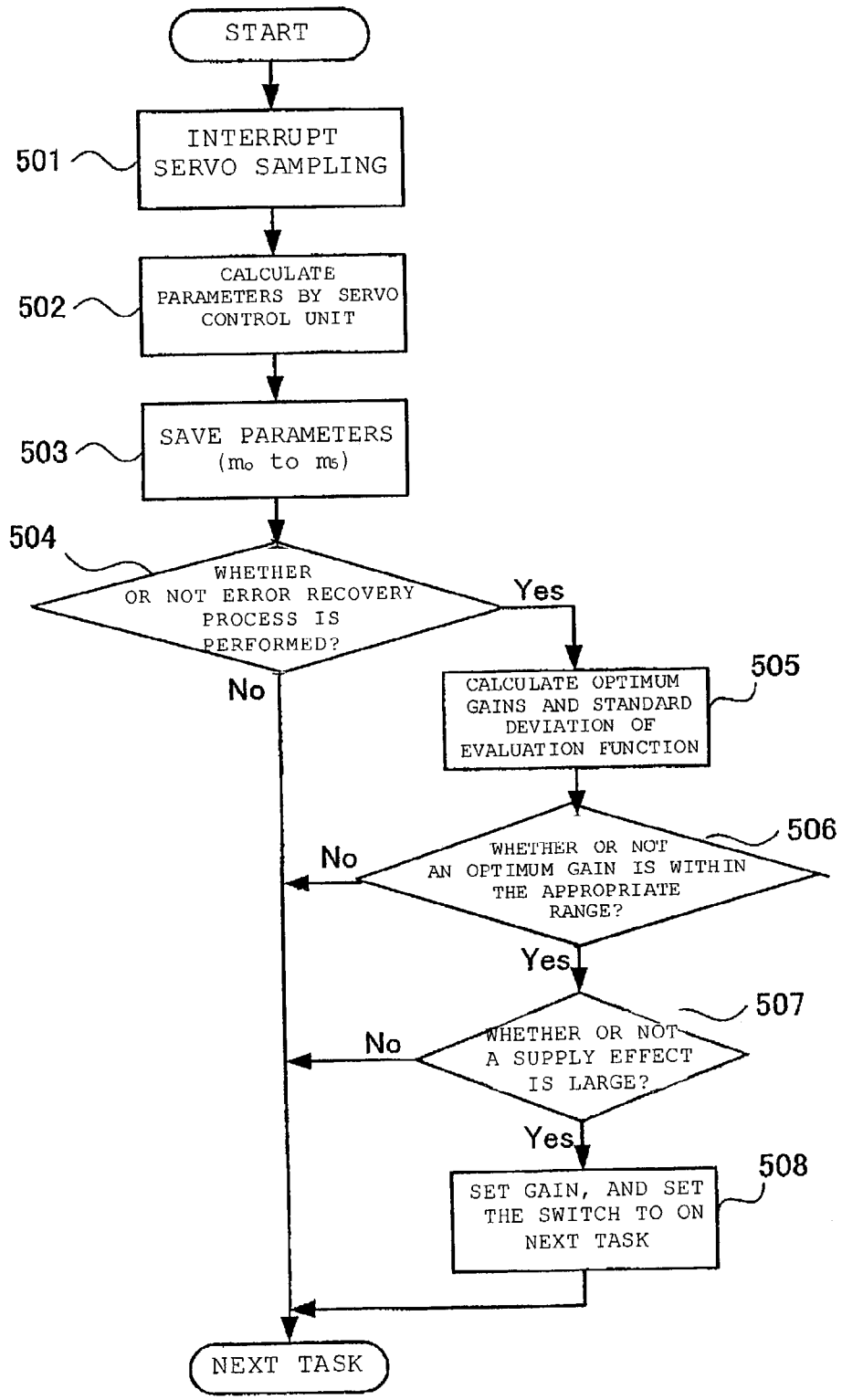
FIG. 5 is a flowchart explaining an operation performing a supply control of the correction signal in this embodiment.

FIG. 5 is a flowchart for explaining the operation performing the supply control of the correction signal based on the above conditions. FIG. 5 describes a processing (task) performed once at every predetermined time interval.

When the predetermined time elapses, first, servo sampling in the servo control unit 10 is interrupted (Step 501), and the foregoing six elements $m_0$ to $m_5$ are calculated (Step 502). Then, the calculated six elements $m_0$ to $m_5$ are saved in the storage device such as a cache memory (Step 503).

Here, it is determined whether or not the processing proceeds to an off-track error recovery process (displayed as "error recovery processing" in FIG. 5) based on the above-described conditions. When the processing does not proceed, the processing is terminated as it is, and the next processing cycle is started, that is, the servo sampling is resumed, and then the elapse of the predetermined time is awaited (Step 504).

Meanwhile, when the processing proceeds to the off-track error recovery process, the optimum gains $k_{1\ opt}$ and $k_{2\ opt}$ of the linear acceleration sensors 31 and 32 and the standard deviation $V^2$ of the evaluation function V are first obtained (Steps 504 and 505). Then, it is investigated whether the calculated optimum gains $k_{1\ opt}$ and $k_{2\ opt}$ are in appropriate ranges ($k_{1\ min} \leq k_{1\ opt} \leq k_{1\ max}$, $k_{2\ min} \leq k_{2\ opt} \leq k_{2\ max}$) or not. If the optimum gains are not in the appropriate ranges, the correction is unnecessary, and therefore, the processing in the task is terminated (Step 506).

If the calculated optimum gains $k_{1\ opt}$ and $k_{2\ opt}$ are values in the appropriate ranges, then it is investigated whether or not the effect of supplying the correction signal to the servo loop is sufficiently large (exceeding the reference value $s_1$). If the effect is not large, the correction is determined to be unnecessary therefor, and the processing in the task is terminated (Step 507).

On the contrary to this, if the effect of supplying the correction signal is large, then the gain of the sensor 914 (linear acceleration sensors 31 and 32) in the correction signal generation unit 20 is set as the optimum gain, and the switch 40 is switched on by the correction signal control unit 30 to supply the correction signal to the servo loop (Step 508).

Meanwhile, when a condition composed of OR or AND of the following six conditions is established, the switch 40 is switched off by the control of the correction signal control unit 30 to stop the supply of the correction signal.

1) when the optimum gain calculated from the values of the foregoing stored elements $m_1$ to $m_5$ are within a scheduled range that is when $$k_{1\ min} \leq k_{1\ opt} \leq k_{1\ max}, k_{2\ min} \leq k_{2\ opt} \leq k_{2\ max}$$

(when the estimation for the gain is invalid);
2) when the second term of Equation 11 is smaller than a predetermined reference value $S_2$ represented as follows (when it is not very effective to supply the correction signal to the servo loop);

$$s_2 > \frac{-2m_1 \cdot m_2 \cdot m_3 + m_2^2 \cdot m_4 + m_1^2 \cdot m_5}{m_3^2 - m_4 \cdot m_5} \quad \text{Equation 17}$$

3) when the value of the foregoing stored element $m_0$ is smaller than the reference value $m_{0\ min}$ (when the correction is unnecessary since the off-track does not occur);
4) when the value of the foregoing stored element $m_4$ is smaller than the reference value $m_{4\ min}$ (when the vibration detected from the sensor 914 is not large);
5) when the value of the foregoing stored element $m_5$ is smaller than the reference value $m_{5\ min}$ (when the vibration detected from the sensor 914 is not large); and
6) when the value of $m_4+m_5+2m_3$ based on the foregoing stored elements $m_3$ to $m_5$ is larger than the reference value $s_{4\ max}$ (when the component of the linear vibration detected from the sensor is large).

The correction signal supplied to the servo loop is stopped in accordance with the above conditions in following a procedure shown in FIG. 5.

In the operation shown in FIG. 5, the elements $m_0$ to $m_5$ are calculated before determining whether the processing proceeds to the off-track error recovery process. However, the elements $m_0$ to $m_5$ may be calculated to be stored in the storage device such as a cache memory after the processing has proceeded to the off-track error recovery process.

Moreover, it is possible to simplify the calculations of the elements $m_0$ to $m_5$ by taking time moving averages as shown below instead of using Equation 12.

$$m_0(n)=(1-q_0) \cdot m_0(n-1)+q_0 \cdot Pes(n)^2$$

$$m_1(n)=(1-q_1) \cdot m_1(n-1)+q_1 \cdot Pes(n) \cdot yc_1(n)$$

$$m_2(n)=(1-q_2) \cdot m_2(n-1)+q_2 \cdot Pes(n) \cdot yc_2(n)$$

$$m_3(n)=(1-q_3) \cdot m_3(n-1)+q_3 \cdot yc_1(n) \cdot yc_2(n)$$

$$m_4(n)=(1-q_4) \cdot m_4(n-1)+q_4 \cdot yc_1^2(n)$$

$$m_5(n)=(1-q_5) \cdot m_5(n-1)+q_5 \cdot yc_2^2(n)$$

where $0<q_i<1$.

Next, another embodiment in the present invention will be described.

When the gains of the two linear acceleration sensors 31 and 32 are assured to coincide with each other as a result of investigating the gains at the manufacturing stage of the hard disk device 91, the optimum gains can be estimated by significantly simplifying the processing in the correction signal control unit 30, and thus the appropriate on/off switching control for the switch 40 can be carried out.

Figure 6:
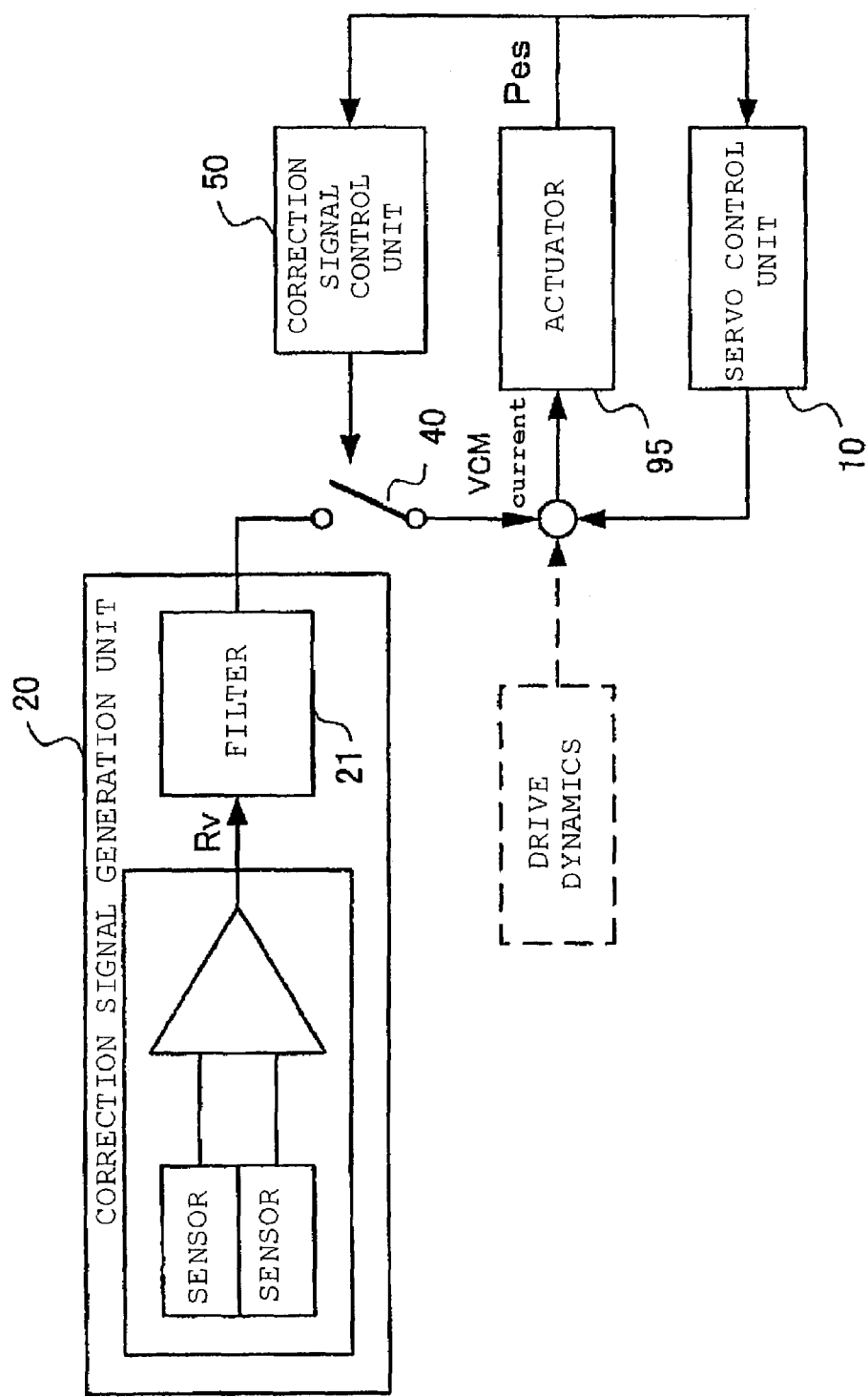
FIG. 6 is a block diagram showing a configuration with regard to a control mechanism for an actuator in a hard disk device according to another embodiment in the present invention.
Figure 7:
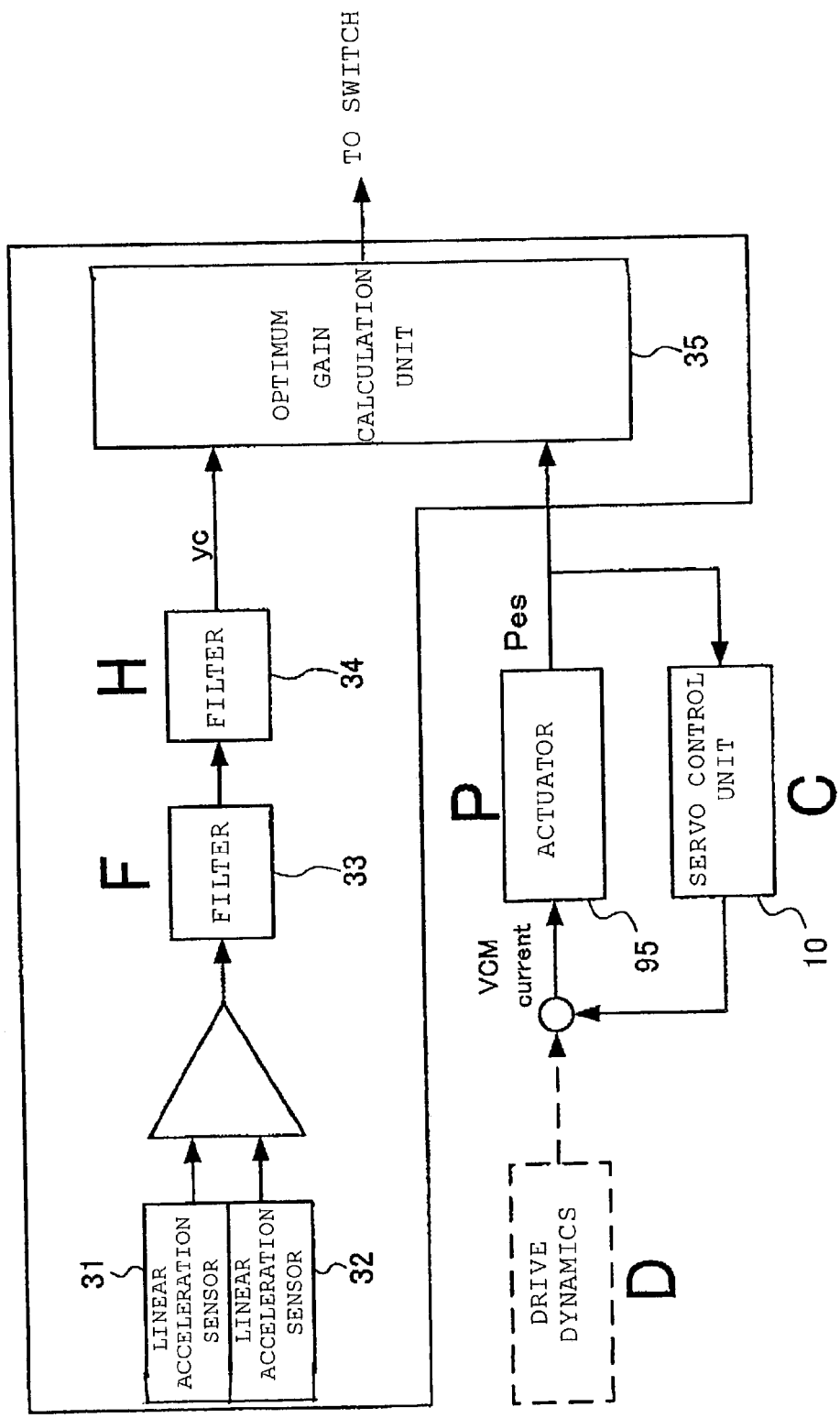
FIG. 7 is a diagram showing a configuration of a correction signal control unit in this embodiment.

FIG. 6 is a block diagram showing a configuration with regard to a control mechanism for the actuator in the hard disk device 91 in this embodiment, and FIG. 7 is a diagram showing the configuration of the correction signal control unit 50 thereof.

Similarly to the correction signal control unit 30 as shown in FIG. 2, the correction signal control unit 50 of FIG. 7 passes the outputs of the two linear acceleration sensors 31 and 32 through the filters 33 and 34 to the optimum gain calculation unit 35. However, while the outputs of the linear acceleration sensors 31 and 32 are passed through the filters 33 and 34 individually in the correction signal control unit 30, in the correction signal control unit 50 a difference between the outputs of the linear acceleration sensors 31 and 32 is passed through the filters 33 and 34. Because the gains of the two linear acceleration sensors 31 and 32 coincide with each other, the difference only includes a component based on the vibration in the rotational direction.

In the hard disk device 91 shown in FIG. 6, when the gain k of the sensor 914 is to be obtained, Pes is represented by the following Equation 18.

$$Pes = \frac{D \cdot P}{1 - PC} Rv - \frac{k \cdot F \cdot P}{1 - PC} Rv \qquad \text{Equation 18}$$

In the optimum gain calculation unit 35 of the correction signal control unit 50, when Pes−k·yc using this gain k is used for the evaluation of the optimum gain, Pes−k·yc is represented as in the following Equation 19.

$$Pes - k \cdot yc = \frac{D \cdot P}{1 - PC} Rv - H \cdot F \cdot k \cdot Rv = \frac{P}{1 - PC} \{D - F \cdot k\} Rv \qquad \text{Equation 19}$$

Specifically, when D=F·k, Equations 19 and 18 become minimal. Accordingly, the evaluation function $V^2$ represented by the following Equation 20 is introduced.

$$V^2 = \sum_n \{Pes(n) - k \cdot yc(n)\}^2 \qquad \text{Equation 20}$$

Then, the gain minimizing this evaluation function $V^2$ can be given by $\partial V^2/\partial k = 0$. Therefore, when Equation 20 is partially differentiated with respect to the gain k, the following Equation 21 is obtained.

$$k_{opt} = \frac{-\sum_n Pes(n) \cdot yc(n)}{\sum_n yc(n)^2} \qquad \text{Equation 21}$$

In this case, the evaluation function $V^2$ is represented by the following Equation 22.

$$V^2 = \sum_n Pes(n)^2 - \frac{\{\sum_n Pes(n) \cdot yc(n)\}^2}{\sum_n yc(n)^2} \qquad \text{Equation 22}$$

Accordingly, if the following parameters are constantly stored in the storage device such as a cache memory, the optimum gain $k_{opt} = -m_1/m_2$ can be calculated from Equation 21 at any time.

$$m_0 = \sum_n Pes(n)^2 \qquad \text{Equation 23}$$

-continued $$m_1 = \sum_n Pes(n) \cdot yc(n)$$

$$m_2 = \sum_n yc^2(n)$$

In the actual processing for the servo, the on/off switching of the switch 40 according to this embodiment is carried out in the following manner.

When a condition composed of OR or AND of the following eight conditions is established, the foregoing optimum gain $k_{opt}$ is set as the gain of the sensor 914 (linear acceleration sensors 31 and 32) in the correction signal generation unit 20, and the switch 40 is switched on by the control of the correction signal control unit 50, and thus the correction by the correction signal is made effective.

1) when the hard disk device 91 power is turned on;
2) when the hard disk device 91 is in some error state;
3) when the error occurrence frequency for either or both of the read/write commands inside the drive has statistically increased to exceed a set reference;
4) when the hard disk device 91 is unable to read or write target data;
5) when the optimum gain calculated from the values of the foregoing stored elements $m_1$ to $m_5$ are within a scheduled range that is when $$k_{min} \leq k_{opt} \leq k_{max}$$

(when the estimation for the gain is valid);
6) when the second term of Equation 22 is larger than the predetermined reference value $s_1$ represented as follows (when it is effective to supply the correction signal to the servo loop);

$$s_1 \leq \frac{m_1^2}{m_2} \qquad \text{Equation 24}$$

7) when the value of the foregoing stored element $m_0$ is larger than the reference value $m_{0\ max}$ (when the off-track occurs and some correction is necessary therefor); and
8) when the value of the foregoing stored element $m_2$ is larger than the reference value $S_{2\ max}$ (when the component of the rotational vibration detected from the sensor is large).

Figure 8:
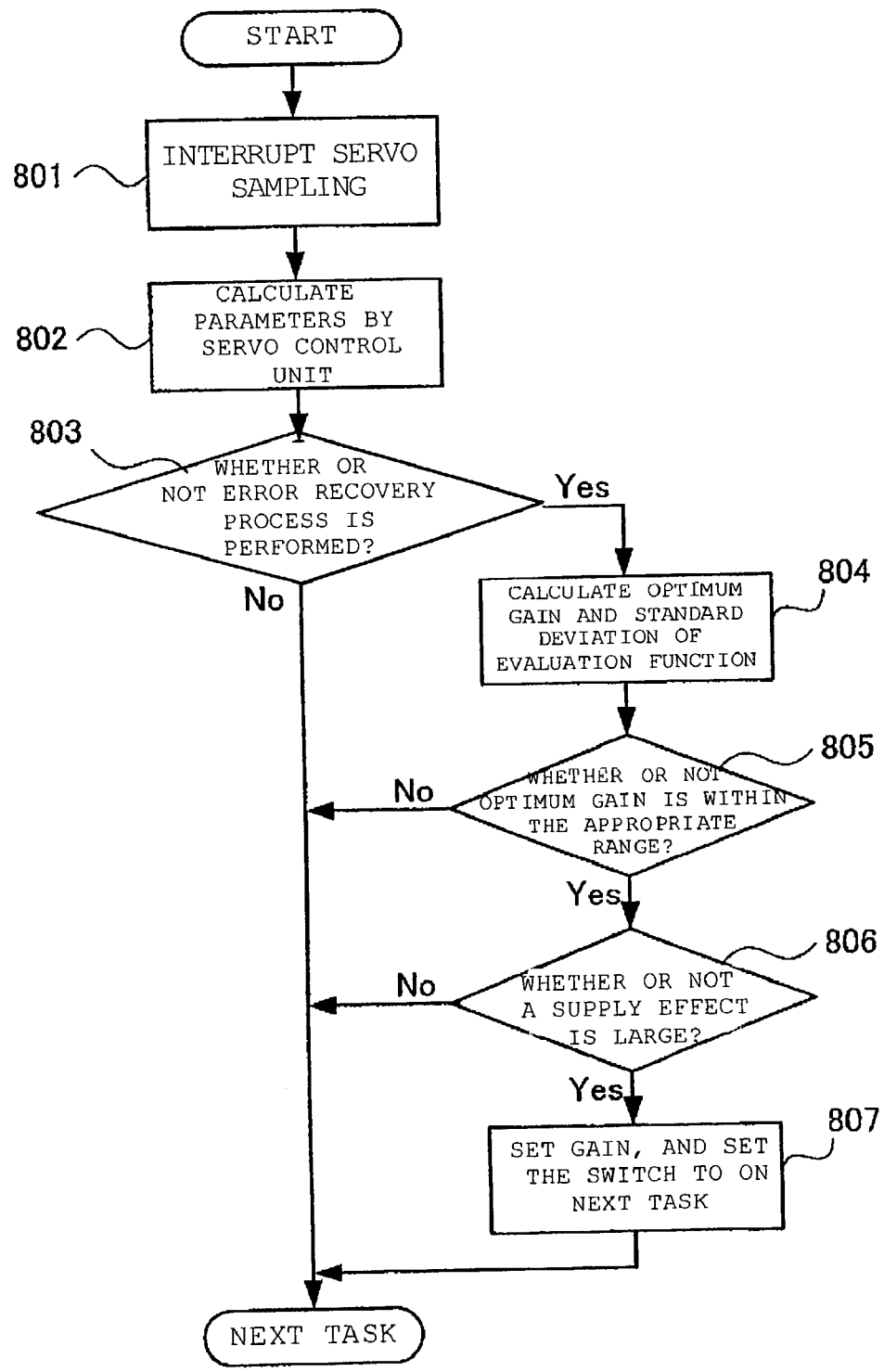
FIG. 8 is a flowchart for explaining an operation for supply control of a correction signal in this embodiment.

FIG. 8 is a flowchart for explaining the operation performing the supply control of the correction signal based on the above conditions. FIG. 8 describes single processing (task) performed at a predetermined time interval.

When the predetermined time elapses, first, servo sampling in the servo control unit 10 is interrupted (Step 801), and the foregoing elements $m_0$ to $m_2$ are calculated (Step 802).

Here, it is determined whether or not the processing proceeds to an off-track error recovery process based on the above-described conditions. When the processing does not proceed, the processing is terminated as it is, and the next processing cycle is started, that is, the servo sampling is resumed, and then the elapse of the predetermined time is awaited (Step 803).

Meanwhile, when the processing proceeds to the off-track error recovery process, the optimum gain $k_{opt}$ of the sensor 914 is first obtained (Steps 803 and 804). Then, it is investigated whether or not the calculated optimum gain $k_{opt}$ is in an appropriate range ($k_{min} \leq k_{opt} \leq k_{max}$). If the optimum gain is not in the appropriate range, the correction is unnecessary, and therefore, the processing in the task is terminated (Step 805).

If the calculated optimum gain $k_{opt}$ is a value in the appropriate range, then it is investigated whether or not the effect of supplying the correction signal to the servo loop is sufficiently large (exceeding the reference value $s_1$). If the effect is not large, the correction is determined to be unnecessary, and the processing in the task is terminated (Step 806).

On the contrary to this, if the effect of supplying the correction signal is large, then the gain of the sensor 914 (linear acceleration sensors 31 and 32) in the correction signal generation unit 20 is set as the optimum gain, and the switch 40 is switched on by the correction signal control unit 50 to supply the correction signal to the servo loop (Step 807).

Meanwhile, when a condition composed of OR or AND of the following four conditions is established, the switch 40 is switched off by the control of the correction signal control unit 50 to stop the supply of the correction signal.

1) when the optimum gain calculated from the values of the foregoing stored elements $m_1$ to $m_5$ is within a scheduled range that is when $k_{min} \leq k_{opt} \leq k_{max}$ (when the estimation for the gain is invalid);

2) when the second term of Equation 22 is smaller than a predetermined reference value $S_2$ represented as follows (when it is effective to supply the correction signal to the servo loop);

$$s_2 \geq \frac{m_1^2}{m_2} \quad \text{Equation 25}$$

3) when the value of the foregoing stored element $m_0$ is smaller than the reference value $m_{0\ min}$ (when the correction is unnecessary since the off-track does not occur);
4) when the value of the foregoing stored element $m_2$ is smaller than the reference value $m_{2\ min}$ (when the vibration detected from the sensor 914 is not large);

The correction signal supply to the servo loop is stopped in accordance with the above conditions in following a procedure as shown in FIG. 8.

As described above, according to the present invention, the gain of the sensor is dynamically controlled, thus making it possible to effectively prevent the occurrence of an operational error in the correction operation based on the sensor output.

Although the preferred embodiments of the present invention have been described in detail, it should be understood that various changes, substitutions and alternations can be made therein without departing from spirit and scope of the inventions as defined by the appended claims.

What is claimed is:

1. A control device comprising:
an actuator;
a servo control unit coupled to the actuator;
a switch having a first terminal and a second terminal, wherein the first terminal of the switch is coupled to the actuator;
a correction signal generation unit having an output coupled to the second terminal of the switch; and
a correction signal control unit coupled to the switch for controlling the switch; and
wherein the correction signal generation unit comprises:
a first linear acceleration sensor; and
a second linear acceleration sensor; and
wherein the servo control unit, the correction signal generation unit, and the correction signal control unit are configured to cooperatively perform the following operations:
interrupting sampling in the servo control unit;
determining whether a condition to perform an error recovery process is established;
and if not, resuming servo sampling;
and if so,
calculating an optimum gain $k_{1\ opt}$ opt of the first linear acceleration sensor and an optimum gain $k_{2\ opt}$ of second linear acceleration sensor; and
determining whether $k_{1\ min} \leq k_{1\ opt} \leq k_{1\ max}$ and $k_{2\ min} \leq k_{2\ opt} \leq k_{2\ max}$;
and if not, resuming servo sampling;
and if so,
determining whether the effect of supplying a correction signal to a servo loop exceeds a refererence value $S_1$;
and if not, resuming servo sampling;
and if so,
setting the gain of the first linear acceleration sensor at the optimum gain $k_{1\ opt}$ and the gain of the second linear acceleration sensor at the optimum gain $k_{2\ opt}$;
supplying the correction signal to the servo loop; and
resuming servo sampling.

2. The control device of claim 1, wherein $k_{1\ opt}$ and $k_{2\ opt}$ are determined by the following equations:

$$k_{1\ opt} = \frac{\sum_n Pes(n) \cdot yc_1(n) \sum_n yc_2^2(n) - \sum_n Pes(n) \cdot yc_2(n) \sum_n yc_1(n) \cdot yc_2(n)}{\sum_n yc_1^2(n) \sum_n yc_2^2(n) - \left\{\sum_n yc_1(n) \cdot yc_2(n)\right\}^2}$$

-continued $$k_{2\,opt} = \frac{-\sum_n Pes(n) \cdot yc_2(n) \sum_n yc_1^2(n) - \sum_n Pes(n) \cdot yc_1(n) \sum_n yc_1(n) \cdot yc_2(n)}{\sum_n yc_1^2(n) \sum_n yc_2^2(n) - \left\{\sum_n yc_1(n) \cdot yc_2(n)\right\}^2}$$

3. The control device of claim 2, wherein the operations further comprise calculating elements $m_0$, $m_1$, $m_2$, $m_3$, $m_4$, and $m_5$, as follows:

$$m_0 = \sum_n Pes(n)^2$$

$$m_1 = \sum_n Pes(n) \cdot yc_1(n)$$

$$m_2 = \sum_n Pes(n) \cdot yc_2(n)$$

$$m_3 = \sum_n yc_1(n) \cdot yc_2(n)$$

$$m_4 = \sum_n yc_1^2(n)$$

$$m_5 = \sum_n yc_2^2(n).$$

4. The control device of claim 1, wherein the control device is a hard disk device, and wherein the condition to perform an error recovery process is when the hard disk device power is turned on.

5. The control device of claim 1, wherein the control device is a hard disk device, and wherein the condition to perform an error recovery process is when the hard disk device is in an error state.

6. The control device of claim 1, wherein the condition to perform an error recovery process is when the error occurrence frequency for read or write commands inside the device has statistically increased to exceed a set reference.

7. The control device of claim 1, wherein the control device is a hard disk device, and wherein the condition to perform an error recovery process is when the hard disk device is unable to read or write target data.

8. The control device of claim 3, wherein the condition to perform an error recovery process is when the value of $m_0$ is larger than a reference value $m_{0\,max}$.

9. The control device of claim 3, wherein the condition to perform an error recovery process is when the value of $m_4+m_5+2m_3$ is larger than a reference value $s_{3\,max}$.

10. The control device of claim 1, wherein the operations further comprise ceasing supplying the correction signal to the servo loop if $k_{1\,min} \leq k_{1\,opt} \leq k_{1\,max}$, and $k_{2\,min} \leq k_{2\,opt} \leq k_{2\,max}$.

11. The control device of claim 3, wherein the operations further comprise ceasing supplying the correction signal to the servo loop if the value of $m_0$ is smaller than a reference value $m_{0\,min}$.

12. The control device of claim 3, wherein the operations further comprise ceasing supplying the correction signal to the servo loop if the value of $m_4$ is smaller than a reference value $m_{4\,min}$.

13. The control device of claim 3, the operations further comprising ceasing supplying the correction signal to the servo loop if the value of $m_5$ is smaller than a reference value $m_{5\,min}$.

14. The control device of claim 3, the operations further comprising ceasing supplying the correction signal to the servo loop if the value of $m_4+m_5+2m_3$ is larger than a reference value $s_{4\,max}$.

15. A control device comprising;
an actuator:
a servo control unit coupled to the actuator;
a switch having a first terminal and a second terminal, wherein the first terminal of the switch is coupled to the actuator;
a correction signal generation unit having an output coupled to the second terminal of the switch; and
a correction signal control unit coupled to the switch for controlling the switch; and
wherein the correction signal generation unit comprises:
a first linear acceleration sensor having an output;
a second linear acceleration sensor having an output; and
a filter having an input and an output, wherein the input of the filter is coupled to the output of the first linear acceleration sensor and to the output of the second linear acceleration sensor, and wherein the output of the filter is the output of the correction signal generation unit; and
wherein the operations further comprise calculating elements $m_0$, $m_1$, $m_2$, $m_3$, $m_4$, and $m_5$, as follows:

$$m_0 = \sum_n Pes(n)^2$$

$$m_1 = \sum_n Pes(n) \cdot yc_1(n)$$

$$m_2 = \sum_n Pes(n) \cdot yc_2(n)$$

$$m_3 = \sum_n yc_1(n) \cdot yc_2(n)$$

$$m_4 = \sum_n yc_1^2(n)$$

$$m_5 = \sum_n yc_2^2(n).$$

16. A control device comprising:
an actuator;
a servo control unit coupled to the actuator;
a switch having a first terminal and a second terminal, wherein the first terminal of the switch is coupled to the actuator;
a correction signal generation unit having an output coupled to the second terminal of the switch; and a correction signal control unit coupled to the switch for controlling the switch; and wherein the correction signal generation unit and the correction signal control unit comprise:

a first linear acceleration sensor having an output;

a second linear acceleration sensor having an output;

a first filter having an input and an output, wherein the input of the first filter is coupled to the output of the first linear acceleration sensor;

a second filter having an input and an output, wherein the input of the second filter is coupled to the output of the first filter;

a third filter having an input and an output, wherein the input of the third filter is coupled to the output of the second linear acceleration sensor;

a fourth filter having an input and an output, wherein the input of the fourth filter is coupled to the output of the third filter; and an optimum gain calculation unit coupled to the output of the second filter and the output of the fourth filter.

17. A control device comprising:

an actuator;

a servo control unit coupled to the actuator;

a switch having a first terminal and a second terminal, wherein the first terminal of the switch is coupled to the actuator;

a correction signal generation unit having an output coupled to the second terminal of the switch; and a correction signal control unit coupled to the switch for controlling the switch; and wherein the correction signal generation unit and the correction signal control unit comprise:

a first linear acceleration sensor having an output;

a second linear acceleration sensor having an output;

a first filter having an input and an output, wherein the input of the first filter is coupled to the output of the first linear acceleration sensor and the output of the second linear acceleration sensor;

a second filter having an input and an output, wherein the input of the second filter is coupled to the output of the first filter; and an optimum gain calculation unit coupled to the output of the second filter.

18. A control device comprising:

an actuator;

a servo control unit coupled to the actuator;

a switch having a first terminal and a second terminal, wherein the first terminal of the switch is coupled to the actuator;

a correction signal generation unit having an output coupled to the second terminal of the switch; and a correction signal control unit coupled to the switch for controlling the switch; and wherein the correction signal generation unit comprises:

a first linear acceleration sensor; and a second linear acceleration sensor; and wherein the servo control unit, the correction signal generation unit, and the correction signal control unit are configured to cooperatively perform the following operations:

interrupting sampling in the servo control unit;

determining whether a condition to perform an error recovery process is established;

and if not, resuming servo sampling;

and if so, calculating an optimum gain $K_{opt}$ of the first and second linear acceleration sensors; determining whether $k_{min} \leq k_{opt} \leq k_{max}$, and if not, resuming servo sampling;

and if so, determining whether the effect of supplying the correction signal to a servo loop exceeds a refererence value $s_1$;

and if not, resuming servo sampling;

and if so, setting the gain of the first linear acceleration sensor and the gain of the second linear acceleration sensor at the optimum gain $k_{opt}$; and supplying the correction signal to the servo loop.

19. The control device of claim 18, wherein the condition to perform an error recovery process is when the value of a variable $m_2$ is larger than a reference value $s_{2\ max}$.

20. The control device of claim 18, wherein the operations further comprise ceasing supplying the correction signal to the servo loop if $k_{min} \leq k_{opt} \leq k_{max}$.

21. The control device of claim 18, wherein the operations further comprise ceasing supplying the correction signal to the servo loop if the value of a variable $m_2$ is smaller than a reference value $m_{2\ min}$.

22. A storage device, comprising:

a voice coil motor;

an actuator coupled to the voice coil motor;

a first linear acceleration sensor;

a second linear acceleration sensor; and a microprocessing unit coupled to the first linear acceleration sensor, the second linear acceleration sensor, and the voice coil motor, wherein the microprocessing unit is configured to perform the following operations:

interrupting servo control sampling;

determining whether a condition to perform an error recovery process is established;

and if not, resuming servo sampling;

and if so, calculating a first optimum gain for the first linear acceleration sensor and a second optimum gain for the second linear acceleration sensor, and a standard deviation of an evaluation function;

determining whether the calculated first optimum gain and second optimum gain are in appropriate ranges;

and if not, resuming servo sampling;

and if so, determining whether the effect of supplying a correction signal to a servo loop exceeds a refererence value $S_1$;

and if not, resuming servo sampling;

and if so, setting the gain of the first linear acceleration sensor at the first optimum gain, and the gain of the second linear acceleration sensor at the second optimum gain;

supplying the correction signal to the servo loop; and resuming servo sampling.

23. The storage device of claim 22, further comprising:

a digital to analog converter coupled to the microprocessing unit;

a voice coil motor driver coupled to the digital to analog converter and the voice coil motor;

a head attached to the actuator;

a spindle motor communicatively coupled to the microprocessing unit;

a magnetic disk coupled to the spindle motor;

a hard disk controller coupled to the microprocessing unit; and a read/write circuit coupled to the hard disk controller and the head.

24. A control device, comprising:
means for interrupting sampling in a servo control unit;
means for determining whether a condition to perform an error recovery process is established;
means for resuming servo sampling;
means for calculating an optimum gain $k_{1\ opt}$ of a first linear acceleration sensor and an optimum gain $k_{2\ opt}$ of a second linear acceleration sensor;
means for determining whether $k_{1\ min} \leq k_{1\ opt} \leq k_{1\ max}$ and $k_{2\ min} \leq k_{2\ opt} \leq k_{2\ max}$;
means for determining whether the effect of supplying a correction signal to a servo loop exceeds a refeerence value $s_1$;
means for setting the gain of the first linear acceleration sensor at the optimum gain $k_{1\ opt}$ and the gain of the second linear acceleration sensor at the optimum gain $k_{2\ opt}$;
means for supplying the correction signal to the servo loop.

25. A method for controlling the position of a head, the method comprising the following operations:
interrupting sampling in a servo control unit;
determining whether a condition to perform an error recovery process is established;
and if not, resuming servo sampling;
and if so,
calculating an optimum gain $k_{1\ opt}$ of a first linear acceleration sensor and an optimum gain $k_{2\ opt}$ of a second linear acceleration sensor;
determining whether $k_{1\ min} \leq k_{1\ opt} \leq k_{1\ max}$ and $k_{2\ min} \leq k_{2\ opt} \leq k_{2\ max}$;
and if not, resuming servo sampling;
and if so, determining whether the effect of supplying a correction signal to a servo loop exceeds a refeerence value $s_1$;
and if not, resuming servo sampling;
and if so,
setting the gain of the first linear acceleration sensor at the optimum gain $k_{1\ opt}$ and the gain of the second linear acceleration sensor at the optimum gain $k_{2\ opt}$; and
supplying the correction signal to the servo loop.

26. A method for controlling the position of a head, the method comprising the following operations:
reading position information on a magnetic disk to obtain a Pes signal indicating an error of a head position;
receiving the Pes signal at a servo control unit and at an optimum gain calculation unit;
receiving the output of a first linear acceleration sensor and a second linear acceleration sensor at the optimum gain calculation unit;
calculating an optimum gain for the first linear acceleration sensor and an optimum gain for the second linear acceleration sensor;
evaluating the effect of supplying to a servo loop, a correction signal that is a function of the calculated optimum gains; and
dynamically setting the gains of the first linear acceleration sensor and the second linear acceleration sensor; and
controlling the supply of the correction signal to a voice coil motor.

27. The method of claim 26, wherein the operations further comprise using the following equation to calculate the optimum gain for the first linear acceleration sensor and the optimum gain for the second linear acceleration sensor: $k_{opt} = -m_1/m_2$.

28. An off-track control method for a data storage device in which a head performs reading and writing of data by scanning a data track of a recording medium, the method comprising the following operations:
calculating an appropriate gain of a sensor based on an output signal of the sensor and a position error signal;
dynamically controlling the gain of the sensor based on a result of the calculation; and
correcting a drive control for an actuator supporting the head based on the output signal of the sensor of which gain is controlled.

29. An off-track control method for a data storage device in which a head performs reading and writing of data by scanning a data track of a recording medium, the method comprising the following operations:
detecting vibration of the data storage device with a sensor;
generating a correction signal for correcting a drive control for an actuator supporting the head based on an output signal of the sensor detecting the vibration;
estimating an effect of supplying the correction signal into a servo loop of the actuator; and
controlling whether the correction signal is to be supplied to the servo loop in response to a result of the estimation.

30. The off-track control method according to claim 29:
wherein the operation of generating the correction signal is performed in such a manner that the correction signal for a rotational vibration is generated based on output signals of a plurality of linear acceleration sensors, and
wherein the operation of estimating an effect of supplying the correction signal includes the following operations:
calculating appropriate gains in the individual linear acceleration sensors based on the output signals of the plurality of linear acceleration sensors; and
estimating the effect of supplying the correction signal to the servo loop of the actuator based on the calculated appropriate gains of the linear acceleration sensors.

* * * * *